United States Patent
Dong et al.

(10) Patent No.: US 11,073,469 B2
(45) Date of Patent: Jul. 27, 2021

(54) QUARTZ-ENHANCED PHOTOACOUSTIC SPECTROSCOPY GAS DETECTION APPARATUS AND METHOD BASED ON BEAT EFFECT

(71) Applicant: SHANXI UNIVERSITY, Shanxi (CN)

(72) Inventors: Lei Dong, Shanxi (CN); Hongpeng Wu, Shanxi (CN); Frank K. Tittel, Shanxi (CN); Liantuan Xiao, Shanxi (CN); Suotang Jia, Shanxi (CN)

(73) Assignee: SHANXI UNIVERSITY, Shanxi (CN)

( * ) Notice: Subject to any disclaimer, the term of this patent is extended or adjusted under 35 U.S.C. 154(b) by 0 days.

(21) Appl. No.: 16/080,711

(22) PCT Filed: Mar. 5, 2018

(86) PCT No.: PCT/CN2018/078020
§ 371 (c)(1),
(2) Date: Aug. 29, 2018

(87) PCT Pub. No.: WO2018/188429
PCT Pub. Date: Oct. 18, 2018

(65) Prior Publication Data
US 2020/0232906 A1    Jul. 23, 2020

(30) Foreign Application Priority Data

Apr. 11, 2017  (CN) .......................... 201710234005.4

(51) Int. Cl.
*G01N 21/17* (2006.01)

(52) U.S. Cl.
CPC . *G01N 21/1702* (2013.01); *G01N 2021/1704* (2013.01)

(58) Field of Classification Search
CPC ....... G01N 21/1702; G01N 2021/1704; G01N 21/39; G01N 21/274; G01N 2021/1708;
(Continued)

(56) References Cited

U.S. PATENT DOCUMENTS 3,893,771 A * 7/1975 Bell ....................... G01N 21/39
356/402
4,817,413 A * 4/1989 Asano ................ G01N 21/1702
73/24.02

(Continued)

FOREIGN PATENT DOCUMENTS

| CN | 101706411 A | 5/2010 |
| CN | 103472001 A | 12/2013 |

(Continued)

OTHER PUBLICATIONS

Patimisco et al. "Quartz Enhanced Photoacoustic Spectroscopy: A Review" (Year: 2014).*

*Primary Examiner* — Mohamed K Amara
(74) *Attorney, Agent, or Firm* — Zhong Law, LLC

(57) ABSTRACT

The disclosure relates to a quartz-enhanced photoacoustic spectroscopy gas detection apparatus and method based on beat effect. Provided is a quartz-enhanced photoacoustic spectroscopy gas detection apparatus based on beat effect, comprising a photoacoustic signal detection module, a gas chamber, a light source module and a data acquisition module. In the present invention, by detecting the beat signal generated by mixing the piezoelectric signal output from the quartz tuning fork with the demodulation signal of the lock-in amplifier, the electrical parameters of the quartz crystal oscillator and the concentration of the gas to be measured can be obtained accurately in a time period on the order of milliseconds.

5 Claims, 4 Drawing Sheets

(58) Field of Classification Search
CPC ........... G01N 29/2418; G01N 29/2425; G01N 21/3504; G01N 2201/067
See application file for complete search history.

(56) References Cited

U.S. PATENT DOCUMENTS

| | | | |
|---|---|---|---|
| 6,493,090 B1 | 12/2002 | Lading et al. | |
| 7,245,380 B2* | 7/2007 | Kosterev | G01N 21/1702 250/343 |
| 7,263,871 B2* | 9/2007 | Selker | G01N 21/1702 73/24.02 |
| 7,921,693 B2* | 4/2011 | Van Herpen | G01N 21/1702 73/24.02 |
| 7,924,423 B2* | 4/2011 | Van Neste | G01N 21/1702 356/432 |
| 8,109,128 B2* | 2/2012 | Kalkman | G01N 29/2425 73/24.02 |
| 8,233,150 B2* | 7/2012 | Van Kesteren | G01N 21/3504 356/436 |
| 8,378,286 B2* | 2/2013 | Thundat | H01L 41/1132 250/214 R |
| 8,590,365 B2* | 11/2013 | Weppenaar | F16L 11/12 73/24.02 |
| 8,850,867 B2* | 10/2014 | Schade | G01N 21/1702 73/24.02 |
| 10,307,080 B2* | 6/2019 | Ssenyange | G01N 33/0016 |
| 2004/0095579 A1* | 5/2004 | Bisson | G01N 21/1702 356/432 |
| 2005/0117155 A1* | 6/2005 | Kosterev | G01N 29/2425 356/432 |
| 2009/0288474 A1* | 11/2009 | Kalkman | A61B 5/0095 73/24.02 |
| 2010/0011836 A1* | 1/2010 | Kalkman | G01N 21/1702 73/24.02 |
| 2011/0001964 A1* | 1/2011 | Kalkman | G01N 21/1702 356/301 |
| 2011/0290002 A1* | 12/2011 | Heidrich | G01N 21/1702 73/24.02 |
| 2012/0210796 A1* | 8/2012 | Schade | G01N 21/1702 73/655 |
| 2015/0168958 A1* | 6/2015 | Downie | G05D 11/139 700/282 |
| 2015/0177275 A1* | 6/2015 | Nambu | G01Q 30/14 850/3 |
| 2017/0146490 A1* | 5/2017 | Shinobu | G01N 33/487 |
| 2019/0017966 A1* | 1/2019 | Csutak | E21B 49/081 |
| 2020/0041462 A1* | 2/2020 | Levy | G01N 29/2425 |

FOREIGN PATENT DOCUMENTS

| | | |
|---|---|---|
| CN | 104316466 A | 1/2015 |
| CN | 105136335 A | 12/2015 |
| CN | 105842193 A | 8/2016 |
| DE | 102012217479 B3 | 10/2013 |

* cited by examiner

QUARTZ-ENHANCED PHOTOACOUSTIC SPECTROSCOPY GAS DETECTION APPARATUS AND METHOD BASED ON BEAT EFFECT

CROSS-REFERENCE TO RELATED APPLICATIONS

This application claims priority to International Patent Application No. PCT/CN2018/078020 filed on Mar. 5, 2018, which claims priority to Chinese application No. CN 201710234005.4, filed Apr. 11, 2017, which are hereby incorporated by reference as though fully set forth herein.

TECHNICAL FIELD

The present invention relates to a gas sensing technology, and in particular, to a quartz-enhanced photoacoustic spectroscopy gas detection apparatus and method based on beat effect.

BACKGROUND OF THE INVENTION

Accurate measurement of gaseous components is of importance in various fields such as defense, spaceflight, medical treatment, environmental monitoring. Photoacoustic spectroscopy technology is a type of relatively mature gas detection technology, and is widely applied due to its characteristics such as zero background, non-selectivity to wavelength of light source, and positive correlation between detection sensitivity and power of the light source.

Quartz-enhanced photoacoustic spectroscopy technology is a novel photoacoustic spectroscopy technology (patent specification: US2005/0117155A1) invented by Kosterev et al., Rice University, USA, in 2002. This technique uses an inexpensive tuning fork-type quartz crystal oscillator (or quartz tuning fork for short) instead of an expensive wideband microphone in the conventional photoacoustic spectroscopy technique, as a photoacoustic converter to achieve detection of weak photoacoustic signals. Specifically, after the energy of the excitation light having a wavelength corresponding to the absorption line of the target gas is absorbed by the gas to be measured, a part of the energy of the excitation light is released in the form of acoustic wave due to collision relaxation of the gas molecules, and the frequency of the acoustic wave is the same as the modulation frequency of the excitation light. Therefore, when the excitation light source is modulated at the resonant frequency of the quartz tuning fork, the acoustic wave generated based on the photoacoustic effect would convert the energy into mechanical energy of the periodic vibration of the quartz tuning fork prongs by the resonance with the quartz tuning fork. This part of mechanical energy would be converted into an electrical signal due to the piezoelectric effect of the quartz material and transmitted to the electrical signal detection device via the electrode at the bottom of the quartz tuning fork. Because the piezoelectric signal is positively correlated with the gas concentration, when a certain gas is measured, it is only necessary to perform concentration calibration on the measuring device with the gas of a known concentration in advance, and then the gas can be measured by the calibrated device.

The quartz tuning fork which is currently widely used for quartz-enhanced photoacoustic spectroscopy sensors is a commercially available quartz tuning fork having a high quality factor Q (quality factor Q>10, 000 for bare tuning forks under normal pressure) and a nominal frequency (i.e., the frequency specified in the specification for crystal elements) $f_0$ of about 32.7 kHz, and the prong gap of the quartz tuning fork is about 0.3 mm. Such a high quality factor allows the quartz tuning fork to have an extremely narrow frequency response range (at normal pressure, about 2 Hz). Therefore, for a traditional quartz-enhanced photoacoustic spectroscopy trace gas detection apparatus, the modulation frequency of the excitation light source must be exactly the same as the resonant frequency of the quartz tuning fork. However, due to the influence of factors such as machining process, usage environment (including gas components, gas pressure, ambient temperature, etc.) and the material characteristics, it is difficult to maintain the actual resonant frequency of the quartz tuning fork consistent with the nominal resonant frequency thereof for a long time. Therefore, the resonant frequency of the quartz tuning fork in the traditional quartz-enhanced photoacoustic spectroscopy sensing apparatus must be measured repeatedly and accurately; otherwise, the quartz crystal oscillator would not be able to respond efficiently to the photoacoustic signal which is proportional to the gas concentration. The repetitive frequency measurement process not only increases the complexity of the apparatus and the difficulty of use, but also makes the quartz-enhanced photoacoustic spectroscopy sensing apparatus impossible to perform continuous on-line monitoring of trace gases. In addition, the response time of the above-mentioned quartz tuning fork is about 100 ms, and considering the necessary related measurement processes such as data acquisition and processing, the response period of the conventional quartz-enhanced photoacoustic spectroscopy trace gas monitoring apparatus is at least 500 ms. Such a long response time cannot meet the requirement for real-time and efficient detection of trace gases in various fields of current society.

SUMMARY OF THE INVENTION

An object of the present invention is to solve the technical problems that the existing gas detection apparatus and method have a long detection cycle and a poor detection sensitivity and require frequent calibration for the electrical parameters of the quartz tuning fork during the gas detection process, and provide a quartz-enhanced photoacoustic spectroscopy gas detection apparatus and method based on beat effect.

In order to solve the above technical problems, the present invention provides a quartz-enhanced photoacoustic spectroscopy gas detection apparatus based on beat effect, comprising a photoacoustic signal detection module, a gas chamber, a light source module and a data acquisition module.

The photoacoustic signal detection module may include a tuning fork-type quartz crystal oscillator. The opposing side walls of the gas chamber are provided with an entrance window and an exit window, respectively. A gas inlet is arranged on the side of the lower end of the gas chamber close to the entrance window, and a gas outlet is arranged on the side of the upper end of the gas chamber close to the exit window. The photoacoustic signal detection module is vertically arranged in the inner cavity of the gas chamber via a support, and the entrance window and the exit window of the gas chamber are located on the same optical path.

The light source module comprises a laser light source, a first function generator, a second function generator and a beam focusing device, wherein the signal output terminal of the first function generator is connected to a current scanning input port of the laser light source, the signal output terminal of the second function generator is connected to the current modulation input port of the laser light source, the light beam focusing device is arranged on the outgoing light path of the laser light source, and a laser beam is incident into a micro-acoustic resonant cavity in the gas chamber via the entrance window after passing through the beam focusing device.

The data acquisition module comprises a transimpedance preamplifier, a lock-in amplifier, a data acquisition card and a computer used for processing and recording relevant data and controlling the normal operation of the apparatus. One signal input terminal of the transimpedance preamplifier is connected to one electrode of the tuning fork-type quartz crystal oscillator, and the other signal input terminal is connected to the other electrode of the tuning fork-type quartz crystal oscillator and then grounded. A signal input terminal of the lock-in amplifier is connected to the signal output terminal of the transimpedance preamplifier, and a synchronous signal input terminal of the lock-in amplifier is connected to the synchronous output signal terminal of the second function generator. The signal input terminal of the data acquisition card is connected to the signal output terminal of the lock-in amplifier, and the RS232 interface of the data acquisition card is connected to the signal acquisition port of the computer.

Further, the photoacoustic signal detection module further comprises the micro-acoustic resonant cavity matched with the tuning fork-type quartz crystal oscillator, and the micro-acoustic resonant cavity is located on the same optical path as the entrance window and the exit window of the gas chamber.

The present invention also provides a gas detection method using the quartz-enhanced photoacoustic spectroscopy gas detection apparatus based on beat effect, comprising the steps of:

1) continuously charging gas to be measured from the gas inlet into the chamber and allowing the gas to flow out via the gas outlet;
2) emitting a laser beam from the laser light source under the drive of the first function generator and the second function generator, controlling the amplitude of the scanning voltage of the first function generator, so that the output center wavelength of the laser light source reaches a desired value, and the output wavelength scanning rate of the output wavelength of the laser light source is 18 cm$^{-1}$s$^{-1}$ to 200 cm$^-$s$^{-1}$, controlling the modulation signal frequency of the second function generator to modulate the wavelength of the laser light source, wherein a frequency difference of 10-210 Hz is set between the modulation signal frequency f of the second function generator and the previously measured resonant frequency $f_{i-1}$ (nominal frequency $f_0$ is used in the first measurement, the subscript i representing the $i^{th}$ measurement) of the tuning fork-type quartz crystal oscillator;
3) focusing and shaping the modulated laser beam under the action of the beam focusing device, the focused beam entering the photoacoustic signal detection module in the gas chamber via the entrance window and exiting from the exit window, the laser light interacting with the gas to be measured in the gas chamber and a photoacoustic signal being generated, and converting the photoacoustic signal by the photoacoustic signal detection module into a piezoelectric signal having a frequency which is the resonant frequency $f_i$ of the tuning fork-type quartz crystal oscillator and then transmitting the piezoelectric signal via the electrodes of the tuning fork-type quartz crystal oscillator of the photoacoustic signal detection module to the transimpedance preamplifier;
4) amplifying the received piezoelectric signal by the transimpedance preamplifier and transmitting the amplified piezoelectric signal to the lock-in amplifier, which demodulates the received piezoelectric signal having a frequency of $f_i$ with a demodulation signal having a frequency of f, a beat signal having a frequency of $\Delta f_i$ (the subscript i indicating the $i^{th}$ measurement) being produced after the demodulation and transmitted into the data acquisition card, wherein the detection bandwidth of the lock-in amplifier is 1 kHz to 100 kHz;
5) transmitting the collected beat signal by the data acquisition card into the computer (11) with LabView software to perform calculation processing to obtain a corresponding beat signal map, automatically searching respective peaks of the beat signal by using the LabView software, and extracting a signal value S at any one of peak points from the obtained beat signal map, and calculating the gas concentration value C to be measured by using the formula:

$$C = \frac{S_1 - S_N}{C_0} \cdot S + S_N$$

in which C is the concentration value of the gas to be measured, $S_N$ is the signal value of the apparatus under high purity $N_2$ condition, $S_1$ is the signal value of the corresponding peak point of the apparatus under the condition of a standard gas having a concentration of $C_0$, S is the signal value of the selected peak point, and $C_0$ is the concentration value of the standard gas.

Further, the demodulation of the lock-in amplifier for the received piezoelectric signal is mixed and filtered, and the piezoelectric signal is mixed to form a beat signal having a frequency of $\Delta f_i$, and then filtered and transmitted into the data acquisition card.

Further, the method further comprises the step of: 6) after the respective peaks of the beat signal being automatically searched by the LabView software, calculating the currently measured actual resonant frequency $f_i$ of the quartz tuning fork according to the formula $\Delta f_i = |f - f_i|$ using the first peak value of the beat signal, the time interval between two adjacent peaks and the ring-down time $\tau$ of the beat signal obtained by performing an e-exponential fit on the respective peak points, calculating the quality factor Q of the quartz tuning fork according to the formula $Q = \pi \cdot f_i \cdot \tau$, wherein $\Delta f_i$ is the frequency of the $i^{th}$ measured beat signal, f is the frequency of the modulation signal output from the second function generator, $f_i$ is the actual resonant frequency of the quartz tuning fork at the $i^{th}$ measurement, $\tau$ is the ring-down time of the beat signal, Q is the quality factor of the quartz tuning fork, and $\pi$ is the ratio of circumference to diameter, wherein steps 1)-6) are repeated to perform a continuous measurement of the gas concentration.

The present invention providing the following advantages:

1. Compared to a quartz-enhanced photoacoustic spectroscopy trace gas detection apparatus in the prior art, the apparatus according to the present invention can complete measurement of basic electrical parameters (resonant frequency, quality factor) of the quartz tuning fork while measuring the concentration of the gas to be measured, thereby avoiding repeated calibration for the electrical parameters of the quartz tuning fork during the gas detection process, so that the quartz tuning fork-based gas sensor can be used for long-time, continuous, on-line monitoring of trace gases.

2. In the present invention, by detecting the beat signal generated by mixing the piezoelectric signal output from the quartz tuning fork with the demodulation signal of the lock-in amplifier, the electrical parameters of the quartz crystal oscillator and the concentration of the gas to be measured can be obtained accurately in a time period on the order of milliseconds, which is three orders of magnitude faster than the quartz-enhanced photoacoustic spectroscopy trace gas detection apparatus in the prior art, and the technical problems in the current gas detection that the detection cycle length is long, the detection sensitivity is not high and the electrical parameters of the quartz crystal oscillator need to be frequently calibrated are solved.

3. The apparatus of the present invention greatly simplifies the conventional quartz-enhanced photoacoustic spectroscopy trace gas detection apparatus, reduces the cost of the apparatus, and simplifies the usage process.

4. The present invention has a very strong technical universality and an environmental adaptability, and can be used for on-line monitoring of gases in fields such as environmental monitoring, food safety monitoring and industrial production controlling.

DETAILED DESCRIPTION OF THE INVENTION

The present invention will be further described below with reference to the drawings and embodiments.

EXAMPLE 1

Figure 1:
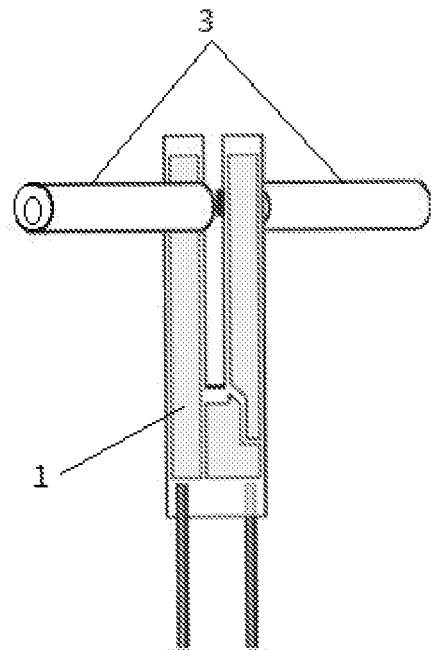
FIG. 1 is a schematic structural diagram of a photoacoustic signal detection module according to the present invention.
Figure 2:
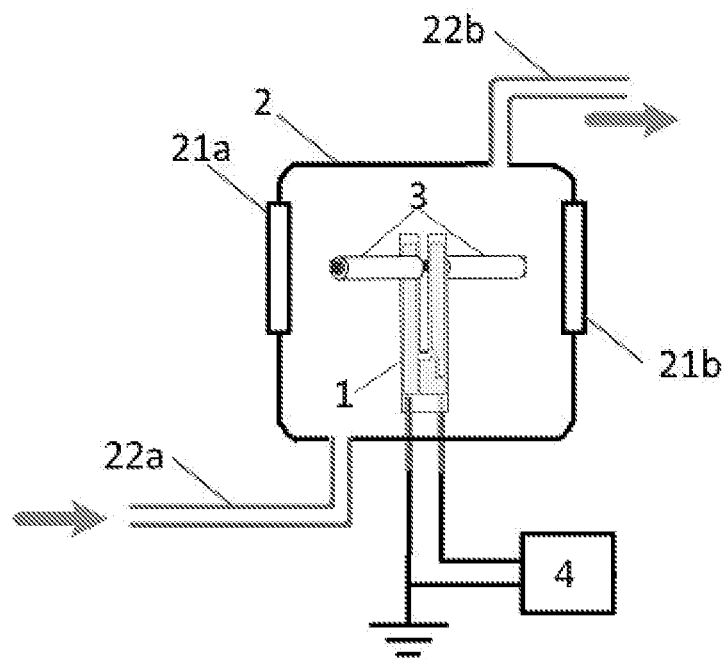
FIG. 2 is a schematic structural diagram of the photoacoustic signal detection module installed in a gas chamber according to the present invention.
Figure 3:
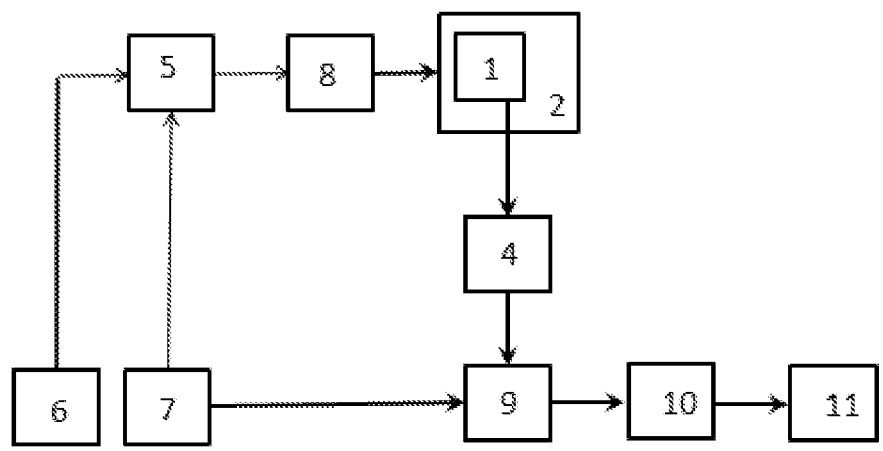
FIG. 3 is a schematic structural diagram of an apparatus according to the present invention.

As shown in FIGS. 1, 2 and 3, in this embodiment, a quartz-enhanced photoacoustic spectroscopy gas detection apparatus based on beat effect comprises a photoacoustic signal detection module, a gas chamber 2, a light source module, and a data acquisition module.

The photoacoustic signal detection module comprises a tuning fork-type quartz crystal oscillator 1 and a micro-acoustic resonant cavity 3 matched with the tuning fork-type quartz crystal oscillator 1. The micro-acoustic resonant cavity 3 is composed of a pair of stainless steel capillaries horizontally arranged on both sides of the tuning fork-type quartz crystal oscillator 1 and perpendicular to the prong plane of the tuning fork-type quartz crystal oscillator 1, wherein the central axes of the two stainless steel capillaries coincide with each other and both of them pass through the prong gap of the tuning fork-type quartz crystal oscillator 1. The opposing side walls of the gas chamber 2 are provided with an entrance window 21a and an exit window 21b, respectively. A gas inlet 22a is arranged on the side of the lower end of the gas chamber 2 close to the entrance window opening 21a, and a gas outlet 22b is arranged on the side of the upper end of the gas chamber 2 close to the exit window 21b. The photoacoustic signal detection module is vertically arranged in the inner cavity of the gas chamber 2 via a support. The entrance window 21a of the gas chamber, the micro-acoustic resonant cavity 3 and the exit window 21b are located on the same optical path. The coupling resonance between the micro-acoustic resonant cavity 3 and the tuning fork-type quartz crystal oscillator 1 can increase the detection sensitivity of the photoacoustic signal detection module by about 30 times.

The light source module comprises a laser light source 5, a first function generator 6, a second function generator 7 and a light beam focusing device 8. The signal output terminal of the first function generator 6 is connected to the current scanning input port of the laser light source 5. The signal output terminal of the second function generator 7 is connected to the current modulation input port of the laser light source 5. A light beam focusing device 8 is arranged on the outgoing light path of the laser light source 5, and a laser light beam is incident into the micro-acoustic resonant cavity 3 in the gas chamber 2 via the entrance window 21a after passing through the beam focusing device 8.

The data acquisition module comprises a transimpedance preamplifier 4, a lock-in amplifier 9, a data acquisition card 10 and a computer 11 for processing and recording relevant data and controlling the normal operation of the apparatus. One signal input terminal of the transimpedance preamplifier 4 is connected to one electrode of the tuning fork-type quartz crystal oscillator 1, and the other signal input terminal is connected to the other electrode of the tuning fork-type quartz crystal oscillator and then grounded. A signal input terminal of the lock-in amplifier 9 is connected to the signal output terminal of the transimpedance preamplifier 4, and a synchronous signal input terminal of the lock-in amplifier 9 is connected to the synchronous signal output terminal of the second function generator 7 so as to ensure that the demodulation signal frequency of the lock-in amplifier 9 is the same as the modulation signal frequency f of the second function generator 7. The signal input terminal of the data acquisition card 10 is connected to the signal output terminal of the lock-in amplifier 9, and the RS232 interface of the data acquisition card 10 is connected to the signal acquisition port of the computer 11.

A gas detection method using the quartz-enhanced photoacoustic spectroscopy gas detection apparatus based on beat effect in the above-described embodiment comprises the steps of:

1) continuously charging air from the gas inlet 22a into the gas chamber 2 and allowing the air to flow out via the gas outlet 22b;

2) emitting a laser beam from the laser light source 5 under the drive of the first function generator 6 and the second function generator 7, adjusting the amplitude of the signal of the first function generator 6 so that the output center wavelength of the laser light source 5 reaches a required value, and the scanning rate of the output wavelength of the laser light source 5 is 18-200 cm$^{-1}$s$^{-1}$ so as to ensure that the photoacoustic signal generated by the gas to be measured is a pulse acoustic signal, controlling a modulation signal frequency of the second function generator 7 to modulate the wavelength of the laser light source 5, wherein a frequency difference of 10-210 Hz needs to exist between the modulation signal frequency f of the second function generator 7 and the nominal frequency $f_0$ of the quartz tuning fork, so as to ensure the generation of the beat signal during the subsequent signal demodulation; in this step, since this is the first measurement, the modulation signal frequency f is determined according to the nominal frequency $f_0$ of the quartz tuning fork, $f_0$ is 32.7 kHz, the modulation signal frequency f is determined as 32550 Hz, and the modulation signal is a sine wave; since the laser current is positively correlated with its laser output wavelength, by changing the amplitude of the voltage of the scanning signal of the first function generator 6, the range of the current of the laser light source 5 can be changed, thereby changing the output light wavelength of the laser light source 5;

3) focusing and shaping the modulated laser beam into a parallel beam having a spot diameter smaller than the prong gap of the quartz tuning fork under the action of the beam focusing device 8, the focused parallel beam entering the micro-acoustic resonant cavity 3 of the photoacoustic signal detection module in the gas chamber 2 via the entrance window 21a and exiting from the exit window 21b, the laser light interacting with the air in the gas chamber 2 and a photoacoustic signal being generated, and converting the photoacoustic signal by the photoacoustic signal detection module into a piezoelectric signal having a frequency which is the resonant frequency $f_1$ (since this is the first measurement, $f_i=f_1$) of the tuning fork-type quartz crystal oscillator 1, and then transmitting the piezoelectric signal via the electrodes of the tuning fork-type quartz crystal oscillator 1 of the photoacoustic signal detection module to the transimpedance pre-amplifier 4;

4) amplifying the received piezoelectric signal by the transimpedance preamplifier 4 and then transmitting the amplified piezoelectric signal to the lock-in amplifier 9, which demodulates the received piezoelectric signal having a frequency of $f_1$ with a demodulation signal having a frequency of f, wherein the frequency of the demodulation signal of the lock-in amplifier 9 is the same as the modulation signal frequency f of the second function generator 7, wherein the demodulation process is composed of mixing and filtering, and the piezoelectric signal is mixed to form a beat signal having a frequency of $\Delta f_1$=208.33 Hz and then filtered and transmitted to the data acquisition card 10, and the detection bandwidth of the lock-in amplifier 9 is 1 kHz to 100 kHz, so as to ensure that the detection bandwidth of the lock-in amplifier 9 is at least 200 times more than the electronic bandwidth of the photoacoustic signal detection module;

5) transmitting the collected beat signal by the data acquisition card 10 into the computer 11 with LabView software to perform calculation processing to obtain a corresponding beat signal map, automatically searching respective peaks of the beat signal by using the LabView software, and extracting a signal value S at any one of peak points from the obtained beat signal map, and calculating the concentration value C of the water vapor in the air by using the formula:

$$C = \frac{S_1 - S_N}{C_0} \cdot S + S_N$$

in which C is the concentration value of water vapor in the air, $S_N$ is the signal value of the apparatus under high purity $N_2$ conditions, $S_1$ is the signal value of the apparatus under the condition of a standard gas having a concentration of $C_0$, S is the signal value of the selected peak point, and $C_0$ is the concentration value of the standard gas.

In this embodiment, the standard gas having the concentration of $C_0$ is the water vapor having a concentration of 1%.

EXAMPLE 2

The quartz-enhanced photoacoustic spectroscopy gas detection apparatus and a method based on beat effect in this embodiment are similar to those in Embodiment 1, wherein the method further comprises the step:

6) after the respective peaks of the beat signal being automatically searched by the LabView software, calculating the resonant frequency $f_1$ of the quartz tuning fork according to the formula $\Delta f_1=|f-f_1|$ by using the first peak value of the beat signal, the time interval between two adjacent peaks and the ring-down time $\tau$=0.01764 s of the beat signal obtained by performing an e-exponential fit on the respective peak points, and calculating the quality factor Q of the quartz tuning fork according to the formula $Q=\pi \cdot f_1 \cdot \tau$, wherein $\Delta f_1$ is the frequency of the beat signal, f is the frequency of the modulated current output by the second function generator 7, $f_1$ is the actual resonant frequency of the quartz tuning fork at the first measurement, $\tau$ is the ring-down time of the beat signal, Q is the quality factor of the quartz tuning fork, and $\pi$ is the ratio of circumference to diameter.

Steps 1)-6) are repeated to perform a continuous measurement of the gas concentration.

Figure 4:
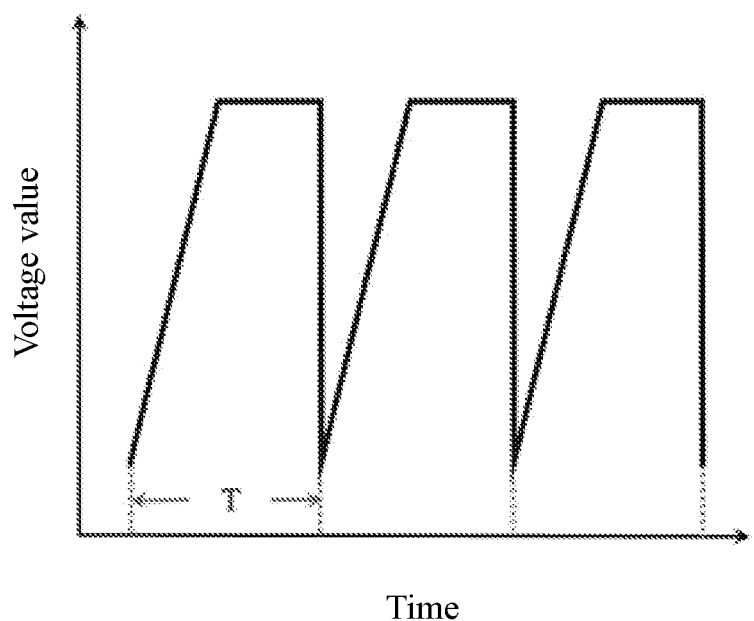
FIG. 4 shows a scanning signal output from a first function generator.

FIG. 4 shows a scanning signal output from the first function generator 6. The scanning voltage corresponding to the wavelength of the absorption line of the water vapor is located in the middle of the ramp voltage in the first half of the scanning signal. Since the damping vibration, which is formed after the quartz tuning fork is driven by the acoustic pulse, would continue for a period of time, in order to avoid the damping vibration formed before is interfered by the vibration caused by the subsequent acoustic pulse, a constant voltage is applied for a period of time in this embodiment after the end of the ramp voltage scanning, so that there is sufficient time for the quartz tuning fork to complete the damping vibration. Unlike the conventional quartz-enhanced photoacoustic spectroscopy, the period of the scanning signal in the present invention is less than 1 s to ensure that the scanning rate of the wavelength of the laser is greater than 18 cm$^{-1}$/s, thereby reducing the duration of the acoustic wave acting on the tuning fork prongs to a time scale sufficient to excite the transient vibration mode of the quartz tuning fork.

Figure 5:
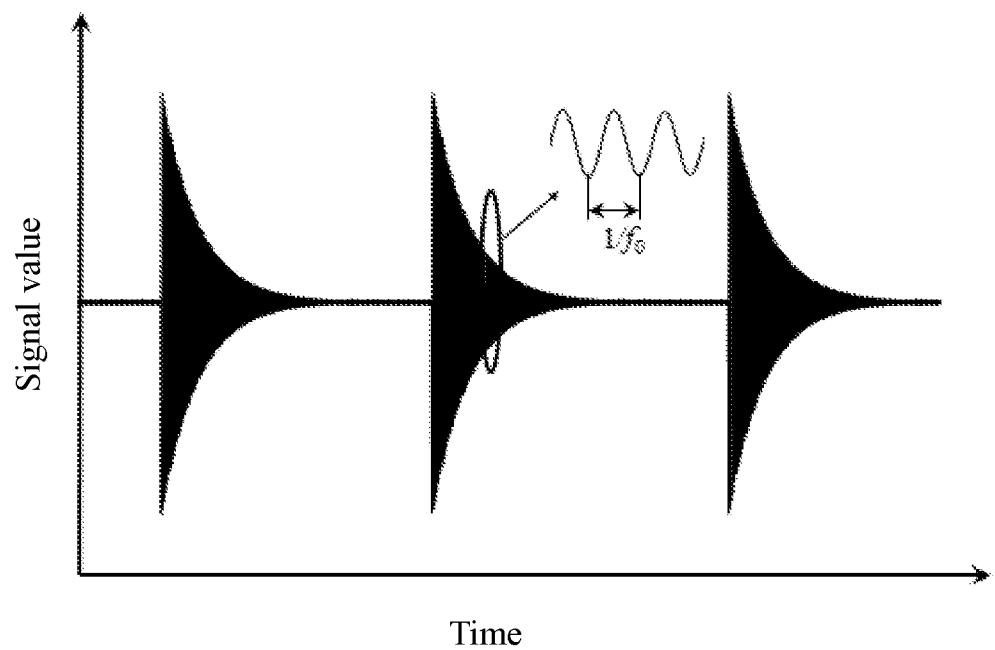
FIG. 5 shows a piezoelectric signal generated from a quartz tuning fork driven by an acoustic pulse.

FIG. 5 shows a piezoelectric signal generated from the quartz tuning fork driven by an acoustic pulse. The quartz tuning fork would continue to vibrate at the self-resonant frequency $f_1$ after the acoustic pulse disappears, and the energy accumulated in the photoacoustic detection system would be consumed by the self-loss and the external loss during the vibration process, and a piezoelectric signal having a frequency that is the resonant frequency $f_1$ of the tuning fork is generated.

Figure 6:
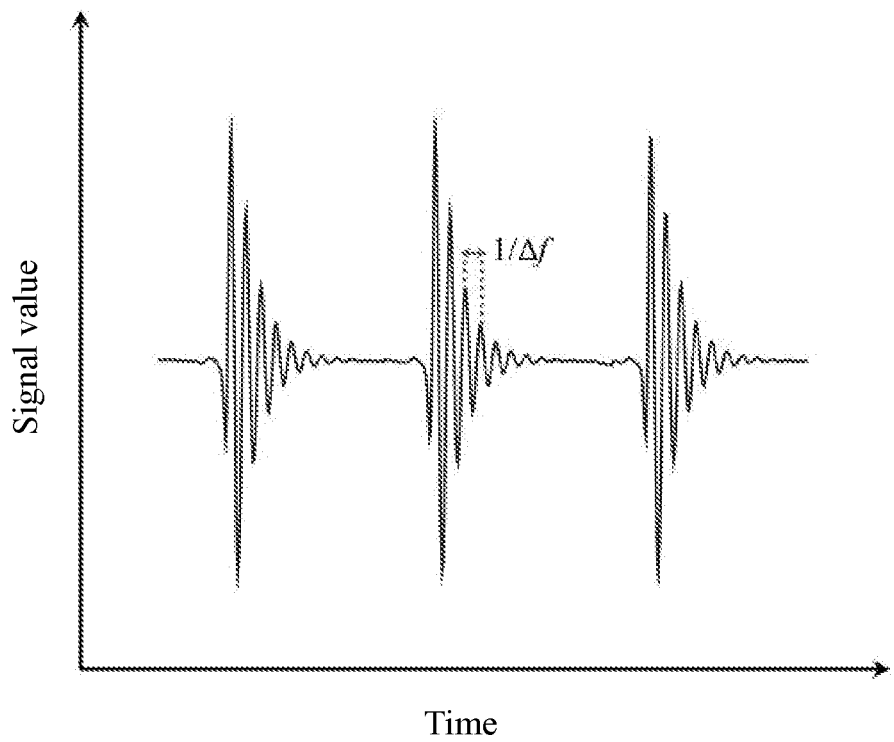
FIG. 6 shows a beat signal output from a lock-in amplifier.

FIG. 6 shows a beat signal output from the lock-in amplifier 9. According to the working principle of the lock-in amplifier, the piezoelectric signal having the frequency of $f_1$ is multiplied by the demodulation signal having the frequency of f in the lock-in amplifier, and a beat signal having a frequency of Δf is generated.

Figure 7:
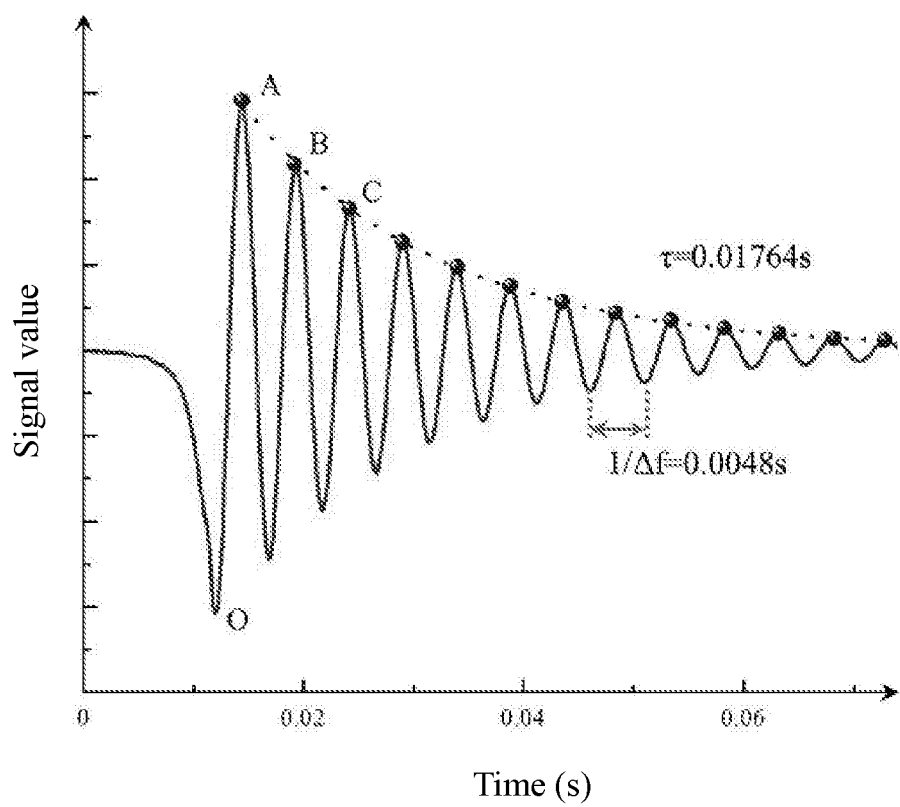
FIG. 7 shows a beat signal automatically processed by a computer.

FIG. 7 shows the result automatically calculated and processed through the Labview software after the beat signal is transmitted to the computer 11 via the DAQ data acquisition card 10 produced by the NI Corp. In the figure, the frequency of the beat signal is $\Delta f=1/0.0048$ Hz=208.33 Hz, and the ring-down time τ of the beat signal is 0.01764 s. In combination with the frequency f=32550 Hz of the modulation signal output from the second function generator 7, the resonant frequency $f_1$ of the quartz tuning fork is calculated as below: $f_1=f+\Delta f=32758.33$ Hz. In addition, the quality factor of the quartz tuning fork is obtained to be 1814.5 according to the formula $Q=\pi \cdot f_1 \cdot \tau$ (which is consistent with the result $f_0'=327550$ Hz, Q=1816 obtained by the conventional electric excitation scanning method).

Figure 8:
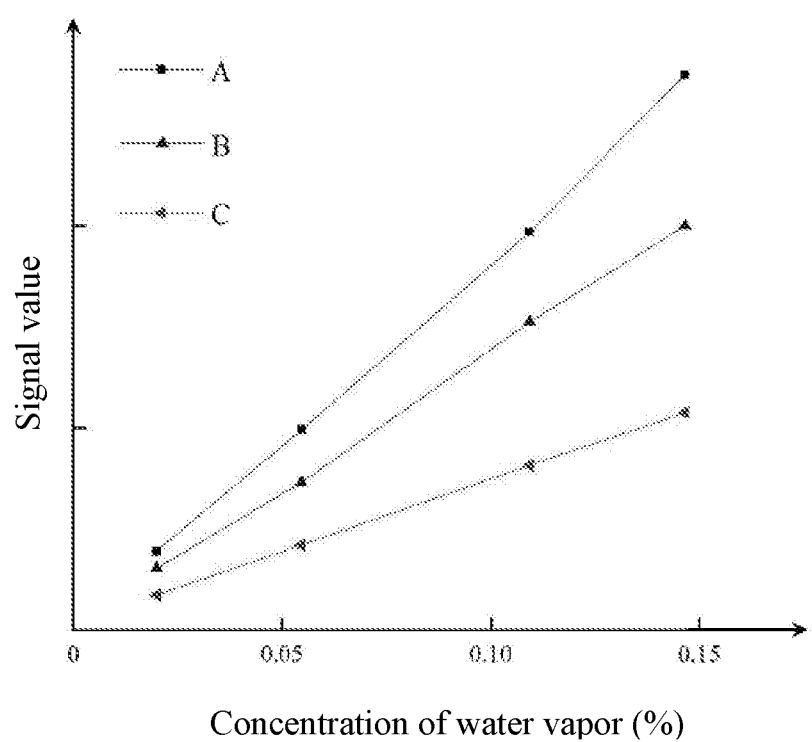
FIG. 8 shows signal values at the respective peak positions of the beat signal under different water vapor concentrations.

FIG. 8 shows signal values at the respective peaks of the beat signal under different water vapor concentrations, wherein A is the signal values at the first peak of the beat signal obtained by the system under different water vapor concentrations, B is the signal values at the second peak of the beat signal obtained by the system under different water vapor concentrations, and C is the signal values at the third peak of the beat signal obtained by the system under different water vapor concentrations. As can be seen from FIG. 8, the respective peak values of the beat signal exhibit a good linearity with respect to the water vapor under the different concentrations, and the concentration of the gas to be measured can be measured by detecting any one of the peaks of the beat signal in practical measurement.

In the present invention, the beam focusing device 8 can be an optical fiber coupled with a lens, or a common focusing lens. The coupled beam can be a parallel beam or a converging beam, and the selection criterion for the beam focusing device 8 is that the laser beam emitted by the laser light source can be converged to have a diameter (or a spot size at the focus position) of less than 0.3 mm.

The first signal peak (peak A) of the beat signal automatically processed by the computer may be influenced by the forced vibration of the tuning fork caused by the acoustic pulse, and therefore the ring-down period of the beat signal is fitted using the second (peak B) and subsequent peak signals.

The principle of the present invention is as follows:

After the laser beam passes through the photoacoustic signal detection module without collision, the modulated beam interacts with the gas to be measured to generate an acoustic wave and drive the quartz tuning fork to vibrate. Since the period of the scanning signal provided by the first function generator is less than 1 s, the scanning rate of the wavelength of the laser light source is greater than 18 $cm^{-1}/s$, so that the acoustic wave generated after the absorption of the light energy by the gas based on the collision decay is an acoustic pulse. The acoustic pulse would drive the tuning fork prongs to vibrate in a short period of time, and after the acoustic pulse disappears, the acoustic energy stored in the photoacoustic detection module would cause the quartz tuning fork to continue to vibrate at the self-resonant frequency $f_i$, but due to the self-loss and the environmental loss existing in the vibration process of the quartz tuning fork, the vibration amplitude of the quartz tuning fork would be attenuated in the e-exponential form. Therefore, in each scanning period of the driving current, the prongs of the quartz tuning fork can reach the magnitude of the vibration in a short time, and then the energy stored in the photoacoustic detection module would be consumed in the damping oscillation mode. In this process, the piezoelectric signal generated by the quartz tuning fork can also be a damping oscillation signal having a frequency which is equal to the resonant frequency $f_i$ of the tuning fork, and the amplitude of the piezoelectric signal corresponds to the concentration of the gas to be measured.

What is claimed is:

1. A quartz-enhanced photoacoustic spectroscopy gas detection apparatus based on beat effect, characterized by comprising a photoacoustic signal detection module, a gas chamber, a light source module and a data acquisition module;

the photoacoustic signal detection module comprising a tuning fork-type quartz crystal oscillator which comprises a first electrode and a second electrode, wherein opposing side walls of the gas chamber are provided with an entrance window and an exit window, respectively, a gas inlet is arranged on a side of a lower end of the gas chamber close to the entrance window, a gas outlet is arranged on a side of an upper end of the gas chamber close to the exit window, the photoacoustic signal detection module is vertically arranged in an inner cavity of the gas chamber via a support, and the entrance window and the exit window of the gas chamber are located on a same optical path;

the light source module comprising:
a laser light source comprising a current scanning input port and a current modulation input port;
a first function generator comprising a first signal output terminal, wherein the signal output terminal of the first function generator is connected to the current scanning input port of the laser light source;
a second function generator comprising a second signal output terminal and a third synchronous signal output terminal, wherein the second signal output terminal of the second function generator is connected to the current modulation input port of the laser light source; and
a device comprising one of a lens or an optical fiber coupled with a lens, the device arranged on an outgoing light path of the laser light source, wherein a laser beam emitted from the laser light source is incident into a micro-acoustic resonant cavity in the gas chamber via the entrance window after being focused through the device;

the data acquisition module comprising:
a transimpedance preamplifier comprising a first signal input terminal, a second signal input terminal and a signal output terminal, wherein the first signal input terminal of the transimpedance preamplifier is connected to the first electrode of the tuning fork-type quartz crystal oscillator, and the second signal input terminal is connected to the second electrode of the tuning fork-type quartz crystal oscillator and then grounded;
a lock-in amplifier comprising a first signal input terminal, a second synchronous signal input terminal and a signal output terminal, wherein the first signal input terminal of the lock-in amplifier is connected to the signal output terminal of the transimpedance preamplifier, and the second synchronous signal input terminal of the lock-in amplifier is connected to the third synchronous signal output terminal of the second function generator;
a data acquisition card comprising a signal input terminal connected to the signal output terminal of the lock-in amplifier, and an RS232 interface; and a computer for processing and recording relevant data and controlling an operation of the apparatus comprising a signal acquisition port connected to the RS232 interface of the data acquisition card, wherein the laser light source is configured to emit a laser beam under the drive of the first function generator and the second function generator, wherein an amplitude of a scanning voltage of the first function generator is adjusted so that an output center wavelength of the laser light source reaches a desired value, and a scanning rate of the output center wavelength of the laser light source is 18 cm$^{-1}$s$^{-1}$ to 200 cm$^{-1}$s$^{-1}$, wherein a modulation signal frequency of the second function generator is controlled to modulate the output center wavelength of the laser light source, and wherein a frequency difference of 10-210 Hz is set between a modulation signal frequency f of the second function generator and a previously measured resonant frequency $f_{i-1}$ (nominal frequency $f_0$ is used in a first measurement, the subscript i representing an i$^{th}$ measurement) of the tuning fork-type quartz crystal oscillator.

2. The quartz-enhanced photoacoustic spectroscopy gas detection apparatus based on beat effect according to claim 1, characterized in that the micro-acoustic resonant cavity is matched with the tuning fork-type quartz crystal oscillator, and the micro-acoustic resonant cavity is located on the same optical path as the entrance window and the exit window of the gas chamber.

3. A gas detection method using a quartz-enhanced photoacoustic spectroscopy gas detection apparatus the quartz-enhanced photoacoustic spectroscopy gas detection apparatus comprising a photoacoustic signal detection module, a gas chamber, a light source module and a data acquisition module;

the photoacoustic signal detection module comprising a tuning fork-type quartz crystal oscillator which comprises a first electrode and a second electrode, wherein opposing side walls of the gas chamber are provided with an entrance window and an exit window, respectively, a gas inlet is arranged on a side of a lower end of the gas chamber close to the entrance window, a gas outlet is arranged on a side of an upper end of the gas chamber close to the exit window, the photoacoustic signal detection module is vertically arranged in an inner cavity of the gas chamber via a support, and the entrance window and the exit window of the gas chamber are located on a same optical path;

the light source module comprising:
a laser light source comprising a current scanning input port and a current modulation input port;
a first function generator comprising a first signal output terminal, wherein the signal output terminal of the first function generator is connected to the current scanning input port of the laser light source;
a second function generator comprising a second signal output terminal and a third synchronous signal output terminal, wherein the second signal output terminal of the second function generator is connected to the current modulation input port of the laser light source; and
a device comprising one of a lens or an optical fiber coupled with a lens, the device arranged on an outgoing light path of the laser light source, wherein a laser beam emitted from the laser light source is incident into a micro-acoustic resonant cavity in the gas chamber via the entrance window after being focused through the device;

the data acquisition module comprising:
a transimpedance preamplifier comprising a first signal input terminal, a second signal input terminal and a signal output terminal, wherein the first signal input terminal of the transimpedance preamplifier is connected to the first electrode of the tuning fork-type quartz crystal oscillator, and the second signal input terminal is connected to the second electrode of the tuning fork-type quartz crystal oscillator and then grounded;
a lock-in amplifier comprising a first signal input terminal, a second synchronous signal input terminal and a signal output terminal, wherein the first signal input terminal of the lock-in amplifier is connected to the signal output terminal of the transimpedance preamplifier, and the second synchronous signal input terminal of the lock-in amplifier is connected to the third synchronous signal output terminal of the second function generator;
a data acquisition card comprising a signal input terminal connected to the signal output terminal of the lock-in amplifier, and an RS232 interface; and
a computer for processing and recording relevant data and controlling an operation of the apparatus comprising a signal acquisition port connected to the RS232 interface of the data acquisition card, the method comprising:
1) continuously charging gas to be measured from the gas inlet into the gas chamber and allowing the gas to flow out via the gas outlet;
2) emitting a laser beam from the laser light source under the drive of the first function generator and the second function generator, adjusting an amplitude of a scanning voltage of the first function generator so that an output center wavelength of the laser light source reaches a desired value, and a scanning rate of the output center wavelength of the laser light source is 18 cm$^{-1}$s$^{-1}$ to 200 cm$^{-1}$ s$^{-1}$, controlling a modulation signal frequency of the second function generator to modulate the output center wavelength of the laser light source, wherein a frequency difference of 10-210 Hz is set between a modulation signal frequency f of the second function generator and a previously measured resonant frequency $f_{i-1}$ (nominal frequency $f_0$ is used in a first measurement, the subscript i representing an i$^{th}$ measurement) of the tuning fork-type quartz crystal oscillator;
3) focusing and shaping the modulated laser beam under the action of the device, the focused beam entering the photoacoustic signal detection module in the gas chamber via the entrance window and exiting from the exit window, the laser light interacting with the gas to be measured in the gas chamber and a photoacoustic signal being generated, and converting the photoacoustic signal by the photoacoustic signal detection module into a piezoelectric signal having a frequency which is a resonant frequency $f_i$ of the tuning fork-type quartz crystal oscillator and then transmitting the piezoelectric signal via the electrodes of the tuning fork-type quartz crystal oscillator of the photoacoustic signal detection module to the transimpedance preamplifier, wherein $f_i$ is an actual resonant frequency of the quartz tuning fork at the i$^{th}$ measurement;
4) amplifying the received piezoelectric signal by the transimpedance preamplifier and transmitting the amplified piezoelectric signal to the lock-in amplifier, which demodulates the received piezoelectric signal having a frequency of $f_i$ with a demodulation signal having a frequency of f, a beat signal having a frequency of $\Delta f_i$ (the subscript i indicating an $i^{th}$ measurement) being produced after the demodulation and transmitted into the data acquisition card, wherein a detection bandwidth of the lock-in amplifier is 1 kHz to 100 kHz;

5) transmitting the collected beat signal by the data acquisition card into the computer with LabView software to perform calculation processing to obtain a corresponding beat signal map, automatically searching respective peaks of the beat signal by using the LabView software, and extracting a signal value S at any one of peak points from the obtained beat signal map, and calculating a gas concentration value C to be measured by using:

$$C = \frac{S_1 - S_N}{C_0} \cdot S + S_N$$

in which $S_N$ is the signal value of the apparatus under a condition that the gas chamber is filled with high purity $N_2$, $S_1$ is the signal value of the corresponding peak point of the apparatus under a condition of a standard gas having a concentration of $C_0$, S is the signal value of the selected peak point, and $C_0$ is a concentration value of the standard gas.

4. The method according to claim 3, characterized in that the demodulation of the lock-in amplifier for the received piezoelectric signal is mixing and filtering, and the piezoelectric signal is mixed to form a beat signal having a frequency of $\Delta f_i$, and then filtered and transmitted into the data acquisition card.

5. The method according to claim 3, characterized by further comprising the step:

6) after the respective peaks of the beat signal being automatically searched by the LabView software, calculating the currently measured actual resonant frequency $f_i$ of the quartz tuning fork according to the formula $\Delta f_i = |f - f_i|$ using a first peak value of the beat signal, a time interval between two adjacent peaks and a ring-down time $\tau$ of the beat signal obtained by performing an e-exponential fit on the respective peak points, calculating a quality factor Q of the quartz tuning fork according to the formula $Q = \pi \cdot f_i \cdot \tau$, wherein $\pi$ is the ratio of circumference to diameter, and wherein steps 1)-6) are repeated to perform a continuous measurement of the gas concentration.

* * * * *